(12) United States Patent
Rose-Pehrsson et al.

(10) Patent No.: US 8,064,722 B1
(45) Date of Patent: Nov. 22, 2011

(54) METHOD AND SYSTEM FOR ANALYZING SIGNAL-VECTOR DATA FOR PATTERN RECOGNITION FROM FIRST ORDER SENSORS

(75) Inventors: Susan L. Rose-Pehrsson, Fairfax Station, VA (US); Mark H. Hammond, Alexandria, VA (US); Kevin J. Johnson, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1295 days.

(21) Appl. No.: 11/682,423

(22) Filed: Mar. 6, 2007

Related U.S. Application Data

(60) Provisional application No. 60/779,412, filed on Mar. 7, 2006.

(51) Int. Cl.
*G06K 9/00* (2006.01)
*G01N 30/86* (2006.01)
*G01N 33/50* (2006.01)

(52) U.S. Cl. ............ 382/276; 382/277; 382/278; 327/1; 702/19

(58) Field of Classification Search .......... 382/181, 382/190, 195, 224, 276–278, 305; 327/1; 73/114.63, 114.26–114.29; 702/19
See application file for complete search history.

(56) References Cited

U.S. PATENT DOCUMENTS

| | | | | |
|---|---|---|---|---|
| 3,652,990 A | * | 3/1972 | Darwin | 382/191 |
| 4,245,258 A | * | 1/1981 | Holladay | 358/401 |
| 5,121,443 A | * | 6/1992 | Tomlinson | 382/156 |
| 5,520,881 A | * | 5/1996 | Koestler et al. | 422/3 |
| 5,676,811 A | * | 10/1997 | Makino et al. | 204/425 |
| 5,772,863 A | * | 6/1998 | Shoemaker et al. | 204/426 |

(Continued)

FOREIGN PATENT DOCUMENTS

WO WO 2005002313 A2 * 1/2005

OTHER PUBLICATIONS

Streit et al "Maximum Likelihood Training of Prob Neural Networks" IEEE Transactions on NN, vol. 5, No. 5, Sep. 1994, pp. 1-20.*

(Continued)

*Primary Examiner* — Jason M Repko
*Assistant Examiner* — Mia M Thomas
(74) *Attorney, Agent, or Firm* — Amy L. Ressing; Stephen T. Hunnius

(57) ABSTRACT

A method and system of analyzing signal-vector data from first order sensors including providing a training data set, adjusting the training data set using a background adjustment technique, normalizing and transforming the training data set into wavelet coefficients, using an automated analysis of variance feature selection technique and a pattern recognition technique to classify the training data set. The method and system may also include performing these operations on an unknown sample data set collected under unknown conditions and comparing the unknown sample data set to the classification model to provide an identity of the unknown conditions associated with the unknown sample data set. The present invention is also directed to a computer system for analyzing signal-vector data according to this method and a sensing system that includes a sensor and a microprocessor on which is stored a classification model for real-time sensing of unknown sample data sets.

20 Claims, 7 Drawing Sheets

U.S. PATENT DOCUMENTS

| | | | | |
|---|---|---|---|---|
| 6,166,647 | A * | 12/2000 | Wong | 340/628 |
| 6,218,687 | B1 * | 4/2001 | Ziegler | 257/253 |
| 6,266,704 | B1 * | 7/2001 | Reed et al. | 709/238 |
| 6,277,256 | B1 * | 8/2001 | Garzon et al. | 204/426 |
| 6,289,328 | B2 * | 9/2001 | Shaffer | 706/20 |
| 6,375,816 | B1 * | 4/2002 | Jach et al. | 204/425 |
| 6,524,460 | B1 * | 2/2003 | Hachtel et al. | 205/81 |
| 6,535,562 | B1 * | 3/2003 | Mohseni et al. | 375/296 |
| 6,539,356 | B1 * | 3/2003 | Matsui et al. | 704/270 |
| 6,578,770 | B1 * | 6/2003 | Rosen | 236/49.3 |
| 6,767,442 | B1 * | 7/2004 | Scheer et al. | 204/425 |
| 6,785,401 | B2 * | 8/2004 | Walker et al. | 382/100 |
| 7,034,701 | B1 * | 4/2006 | Rose-Pehrsson et al. | 340/628 |
| 7,316,899 | B2 * | 1/2008 | McDevitt et al. | 435/6 |
| 7,445,699 | B2 * | 11/2008 | Scheer et al. | 204/425 |
| 7,447,609 | B2 * | 11/2008 | Guralnik et al. | 702/179 |
| 7,505,841 | B2 * | 3/2009 | Sun et al. | 701/45 |
| 7,672,782 | B2 * | 3/2010 | Mead et al. | 701/301 |
| 2002/0164046 | A1 * | 11/2002 | Walker et al. | 382/100 |
| 2003/0136676 | A1 * | 7/2003 | Miwa et al. | 204/426 |
| 2003/0161520 | A1 * | 8/2003 | Yamano et al. | 382/128 |
| 2004/0128279 | A1 * | 7/2004 | Matsuura et al. | 707/1 |
| 2004/0140213 | A1 * | 7/2004 | Kanters et al. | 204/424 |
| 2005/0025342 | A1 * | 2/2005 | Lee et al. | 382/107 |
| 2005/0285941 | A1 * | 12/2005 | Haigh et al. | 348/155 |
| 2006/0006997 | A1 * | 1/2006 | Rose-Pehrsson et al. | 340/522 |
| 2006/0159315 | A1 * | 7/2006 | Renz | 382/124 |
| 2008/0030352 | A1 * | 2/2008 | Shaw | 340/579 |
| 2010/0121796 | A1 * | 5/2010 | Staines et al. | 706/20 |

OTHER PUBLICATIONS

Dastidar et al. "Mixed-Band Wavelet Chaos NN Methodology for Epilepsy and Epileptic Seizure Detection" IEEE Transactions on Biomed Engr. Vo.. 54, No. 9, Sep. 2007, pp. 1-7.*

Elgammal et al. "Non-parametric Model for Bakcground Subtraction" Springer Verlag Berlin, ECCV 2000, LNCS 1843, pp. 751-767.*

Vogt et al. "A trainable cermet gas microsensor technology using cyclic voltammetry and NN" Sensors and Actuators B 35-36 pp. 370-376.*

Sedighi et al. "High Impedance Fault Detection Based on Wavelet Transform and Statistical Pattern Recognition" IEEE Transactions on Power Delivery, Vo.. 20, No. 4, Oct. 2005, pp. 1-8.*

Daubechies wavelet transformations: Electronics Letters Jan.17, 1991, vol. 27, No. 2 pp. 1-3.*

Hammond et al. "A novel chemical detector using cermet sensors and pattern recognition methods for toxic industrial chemicals" Science Direct Sensors and Actuators B 116 (2006) pp. 135-144 Oct. 17, 2005.*

Istrate et al. "Sound processing for Health Smart Home" Toward a Human Friendly Assitive Environment IOS Press, 2004, pp. 1-8.*

Strauss et al. "Hybrid Wavelet Support Vector Classification of Waveforms" Journal of Computational and Applied Mathemathics 148 (2002) pp. 375-400.*

Krzanowski, Principles of Multivariate Analysis, Oxford University Press, New York, p. 359 (1988).

Bos, et al, "The wavelet transform for pre-processing IR spectra in the identification of mono-and di-substituted benzenes," Chemometrics and Intelligent Laboratory Systems, vol. 23, No. 1, pp. 115-122 (1994).

Mallet, et al., "Recent developments in discriminant analysis on high dimensional spectral data," Chemometrics and Intelligent Laboratory Systems, vol. 35, No. 2, pp. 157-173 (1996).

Shoemaker, et al., "Cyclic voltammetry applied to an oxygen-ion-conduction solid electrolyte as an active electrocatalytic gas sensor," Solid State Ion., vol. 92, pp. 285-292 (1996).

Vogt, et al., "A trainable cermet gas microsensor technology using cyclic voltammetry and neural networks," Sens. Actuators B: Chem., vol. 36, pp. 370-376 (1996).

Fang, et al., "Wavelet analyses of electroanalytical chemistry responses and an adaptive wavelet filter," Analytica Chimica Acta, vol. 346, No. 3, pp. 319-325 (1997).

Shoemaker, et al., "Gas microsensors using cyclic voltammetry with a cermet electrochemical cell," Sens. Actuators B: Chem., vol. 42, pp. 1-9 (1997).

Shaffer, et al., "Improved probabilistic neural network algorithm for chemical sensor array pattern recognition," Anal. Chem., vol. 71, No. 9, pp. 4263-4271 (1999).

Cocchi, et al., "WPTER: wavelet packet transform for efficient pattern recognition of signals," Chemometrics and Intelligent Laboratory Systems, vol. 57, No. 2, pp. 97-119 (2001).

Ziegler, et al., "Smart Microsensor Arrays for DC-ARM: Data Analysis Report for Fire Testing on ex-USS Shadwell," NRL LTR Report 6180/008A:FWW, (Feb. 1, 2001).

Ionescu, et al., "Quantitative analysis of NO2 in the presence of CO using a single tungsten oxide semiconductor sensor and dynamic signal processing," Analyst, vol. 127, No. 9, pp. 1237-1246 (2002).

Llobet, et al., "Wavelet transform and fuzzy ARTMAP-based pattern recognition for fast gas identification using a micro-hotplate gas sensor," Sensors and Actuators, B: Chemical, vol. 83, No. 1-3, pp. 238-244 (2002).

Tan, et al., "Wavelet analysis applied to removing non-constant, varying spectroscopic background in multivariate calibration," Journal of Chemometrics, vol. 16, No. 5, pp. 228-240 (2002).

Cocchi, et al., "Application of a wavelet-based algorithm on HS-SPME/GC signals for the classification of balsamic vinegars," Chemometrics and Intelligent Laboratory Systems, vol. 71, No. 2, pp. 129-140 (2004).

Rose-Pehrsson, et al., "A novel chemical detector using cermet sensors and pattern recognition methods," Proceedings from 2nd Joint Conference on Point Detection for Chemical and Biological Defense, Williamsburg, VA, (Mar. 1-5, 2004).

Cocchi, et al., "Classification of bread wheat flours in different quality categories by a wavelet-based feature selection/classification algorithm on NIR spectra," Analytica Chimica Acta, vol. 544, No. 1-2, pp. 100-107 (2005).

Ding, et al., "High performance of gas identification by wavelet transform-based fast feature extraction from temperature modulated semiconductor gas sensors," Sensors and Actuators, B: Chemical, vol. 107, No. 2, pp. 749-755 (2005).

Donald, et al., "Integrated wavelet principal component mapping for unsupervised clustering on near infra-red spectra," Chemometrics and Intelligent Laboratory Systems, vol. 77, No. 1-2, pp. 32-42 (2005).

Morris, et al., "Feature extraction and quantification for mass spectrometry in biomedical applications using the mean spectrum," Bioinformatics, vol. 21, No. 9, pp. 1764-1775 (2005).

Vannucci, et al., "NIR and mass spectra classification: Bayesian methods for wavelet-based feature selection," Chemometrics and Intelligent Laboratory Systems, vol. 77, No. 1-2, pp. 139-148 (2005).

Rose-Pehrsson, et al., "A novel chemical detector using cermet," Proceedings from Sensors and Pattern Recognition Methods for Toxic Industrial Chemicals, ISOEN11, Barcelona, Spain, (Apr. 11-13, 2005).

Hammond et al., "General Atomics Smart Microsensors—FY05 Laboratory Fire Test Results," Naval Research Laboratory Technical Report No. NRL/MR/6110--05-8924 (Oct. 31, 2005) (available at <http://handle.dtic.mil/100.2/ADA440173>).

Hammond, et al., "General Atomics Smart Microsensors—FY05 Shipboard Fire Test Results," Naval Research Laboratory Technical Report No. NRL/MR/6180--15-8928 (Dec. 12, 2005) (available at < http://handle.dtic.mil/100.2/ADA444114>).

Beltran, et al., "Feature extraction and classification of Chilean wines," Journal of Food Engineering, vol. 75, No. 1, pp. 1-10 (2006).

Donald, et al., "Adaptive wavelet modeling of a nested 3 factor experimental design in NIR chemometrics," Chemometrics and Intelligent Laboratory Systems, vol. 82, No. 1-2, pp. 122-129 (2006).

Ge, et al., "Identification of gas mixtures by a distributed support vector machine network and wavelet decomposition from temperature modulated semiconductor gas sensor," Sensors and Actuators, B: Chemical, vol. 117, No. 2, pp. 408-414 (2006).

Gutes, et al., "Multivariate calibration model from overlapping voltammetric signals employing wavelet neural networks," Chemometrics and Intelligent Laboratory Systems, vol. 83, No. 2, pp. 169-179 (2006).

Hammond, et al., "A novel chemical detector using cermet sensors and pattern recognition methods for toxic industrial chemicals," Sensors and Actuators B: Chem., vol. 116, pp. 135-144 (2006).

Huang, et al., "Oscillating behaviour of hazardous gas on tin oxide gas sensor: Fourier and wavelet transform analysis," Sensors and Actuators, B: Chemical, vol. 115, No. 1, pp. 357-364 (2006).

* cited by examiner

METHOD AND SYSTEM FOR ANALYZING SIGNAL-VECTOR DATA FOR PATTERN RECOGNITION FROM FIRST ORDER SENSORS

CROSS-REFERENCE TO RELATED APPLICATIONS

This application is a non-provisional application claiming priority to U.S. Provisional Application No. 60/779,412, filed Mar. 7, 2006, which is incorporated herein by reference in its entirety.

FIELD OF THE INVENTION

The present invention is generally directed to a method and system for analyzing a large volume of complex signal-vector data for pattern recognition, particularly from first order sensors.

BACKGROUND OF THE INVENTION

Most conventional sensors for the detection of chemicals and/or fire are electrochemical sensors. Electrochemical sensors operate at a fixed potential. Changes in that fixed potential, caused by the presence of an analyte, signal the analytes presence. Most often these sensors are directed towards the recognition of a single analyte and utilize a single sensor or a simple array of sensors.

Current concerns about homeland security, battlefield protection and terrorist activities have created an interest in sensors that detect a variety of chemicals, such as a variety of blood agents, toxic industrial chemicals, explosives, etc, preferably with specificity for the identification of type and quantity of chemicals detected.

Also, an interest has developed in fire prevention and fire detection. Along with fire detection, early detection of various gases or of precursors of fires, before the presence of flame and smoke, which are necessary for detection using conventional smoke detection/fire detection devices, is also desirable. For example, with increased automation on ships, the Navy has sought fire detection systems capable of improved performance over conventional smoke detectors. To the extent such precursors can be identified, fire prevention can occur in advance of mere fire detection to avoid damage to expensive infrastructure.

Although the use of multiple conventional electrochemical sensors monitoring multiple criteria has been studied for this type of chemical identification with varying degree of success, most of the sensors did not have the specificity desired. For example, in fire detection, multiple criteria electrochemical sensors have difficulty discriminating fire-like nuisance sources, such as welding, grinding steel, and cutting with a torch. Further, multiple criteria electrochemical sensors are typically limited to only a few standardized test sources, without providing the range of detection capability often desired.

Cermet sensors are well known in the art that use various ceramic metallic (cermet) films. See U.S. Pat. No. 6,218,687, which is incorporated herein by reference in its entirety. Rather than operating based on a single potential, some cermet sensors characterize data using cyclic voltammetry, in which current is measured while manipulating the potential in a cyclical fashion. Thus, the data provided by such sensors is provided in a cyclical waveform.

Cermet sensor arrays have been used for more realistic and difficult conditions than prior electrochemical sensors and have been used to identify chemical analytes and fires, particularly distinguishing nuisance sources from harmful events. Such cermet sensors are capable of high temperature operation and can be fabricated using both thick and thin film techniques. Cermet sensors are small, lightweight and low cost alternatives to conventional electrochemical sensors. Plus, cermet sensors have design flexibility since different cermet sensors may respond to the same gas in different ways. Using conventional methods for data analysis of cyclic voltammetry, cermet sensors are capable of detecting very low level concentrations (part per billion) for a variety of analytes using aqueous electrolytes, but only higher levels (parts per million) for gas phase detection.

However, the use of cyclic voltammetry creates complex data waveforms having a great deal of information, such as peak position, magnitude, and shape, all of which can be exploited for analytical purposes. Such waveforms contain data that incorporates variations in the presence, concentration, temperature, accessibility to the sensor, function of the sensor etc. which must be selectively analyzed before any meaningful information about the identity and/or quantity of a certain analyte or fire/non-fire condition can be ascertained.

Previously pattern recognition software has been used to analyze waveform data. However, the shear volume of data generated by cyclic voltammetry has caused concern about accuracy of probable identification of analyte sources, particular in the presence of quite similar nuisance sources. Further, the volume of data required may be more than a microprocessor embedded within a portable device used for field applications is capable of processing in a fast, real-time manner.

Wavelet analysis of analytical data prior to pattern recognition has been used in a variety of different applications. For example, wavelet analysis has been used in medicine to specifically look at identifying conditions from time-dependant data such as EEG and ECG scans and in identifying features of interest in medical imagery. Non-medical applications also included image analysis, as well as optical character recognition, and acoustic pattern recognition.

In sensing applications, wavelet analysis of linear voltammetric data of analytical chemical data, has been demonstrated as a means of de-noising linear voltammetric data. An "electric tongue" system has been developed for monitoring industrial liquid process streams. They utilize a "Wavelet Neural Network" as a pattern recognition technique which incorporates wavelet transformation into a feed forward multilayer neural network architecture. The parameters of the wavelet transform are thus modified by the error propagation structure of the neural network during training. Wavelet packet transforms have also been used for pattern recognition. The wavelet packet transforms have included the use of a Euclidean distance measure to generate the best wavelet basis set of an analytical signal for classification purposes. This approach has been generally applied only to spectroscopic and chromatographic data. Wavelet transformation has also been used for semi-conductor based gas sensors, particularly the use of discrete wavelet transform as a data pretreatment step prior to pattern recognition via a number of different techniques. Wavelet transform followed by classification by a PNN has been done by HPLC-DAD data in the classification of Chilean wines, peak detection in LC-TOF MS data and to capture features in NIR data.

In these various known data analysis techniques, the wavelet-transformed data are not down-selected or narrowed based on any particular classifying ability. As such, the data continues to include random variables and data points which are not necessary for classification purposes. The inclusion of unnecessary data points increases processing time and creates additional variables which can unnecessarily complicate or interfere with pattern recognition. In some cases, the wavelet coefficients may be selected based upon mere visual inspection. However, it is particularly difficult to discern narrow differences by mere visual inspection. In other cases, another "quick and dirty" method has been used to reduces the wavelet data, but not by any particular method particularly suitable for classification purposes. These "quick and dirty" methods do not ensure selection of the most desirable features of a wavelet, which can lead to lack of accuracy in pattern recognition.

BRIEF SUMMARY OF THE INVENTION

The present application is generally directed to a method for characterizing signal-vector data using automatic feature selection techniques on wavelet-transformed data to enhance the use of pattern recognition techniques for classification purposes. Automatic feature selection has the advantage of extracting only the relevant information from wavelet-transformed data for improved classification of signal-vector data, which leads to increased effectiveness in classification of first order sensor data. By reducing data to only relevant information, data processing times and microprocessor memory requirements are reduced, which results in better response times for first order sensors, as well as an increase in accuracy of sensing applications. For example, in chemical sensing application, the improved classification creates better sensitivity and increased recognition of unknown analytes in real-time, and, in fire detection, improved classification enhances fire detection by better distinguishing fires from nuisance sources.

An embodiment of the present invention is a method of analyzing signal-vector data from at least one first order sensor, which includes providing a training data set that includes signal-vector data from at least one first order sensor, wherein the training data set includes background data and sample data collected under known conditions. The sample data of the training data set is then adjusted to account for variations between the background data and the sample data using a background adjustment technique. The method then includes normalizing the training data set and transforming the normalized training data set into wavelet coefficients using a wavelet transformation technique. Using an automated analysis of variance feature selection technique, desirable wavelet coefficients for classification are then automatically selected. Then, a pattern recognition technique is used to classify the training data set. A classification model generated from the pattern recognition technique is then output.

This embodiment may also include a prediction step which includes providing an unknown sample data set that includes signal-vector data from a first order sensor, wherein the sample data set includes unknown sample data collected under unknown conditions. The unknown sample data of the unknown sample data set is adjusted to account for variations between the background data and the unknown sample data using the same method used for the training data set. The unknown sample data set is normalized using the same method used for the training data set, and the normalized unknown sample data set is transformed into wavelet coefficients using the same wavelet transformation technique used for the training data set. The method also includes automatically selecting the same desirable wavelet coefficients selected from the wavelet-transformed data of the training data set in the wavelet-transformed data of the unknown sample data set. The same pattern recognition technique for the training data set is used to compare the unknown sample data set to the classification model. An output is provided including an identity of the unknown conditions associated with the unknown sample data set.

Another embodiment of the present invention is a computer system that includes a training data set comprising signal-vector data, including background data and sample data provided by at least one first order sensor under known conditions and a processor that receives the training data set and memory capable of storing a classification model generated from a pattern recognition technique. The processor includes software suitable for each of the following applications: adjusting the sample data to account for variances between the background data and the sample data, normalizing the training data set, transforming the normalized training data set into wavelet-transformed data using a wavelet transformation technique, automatically selecting desirable wavelet coefficients for classification using analysis of variance feature selection technique and classifying the training data set using the pattern recognition technique.

This embodiment may also include an unknown sample data set comprising signal-vector data, including unknown sample data provided by the at least one first order sensor under unknown conditions. Also, the processor may further included software suitable for each of the following applications: adjusting the unknown sample data to account for variances between the background data and the unknown sample data in the same manner as the training data set, normalizing the unknown sample data set in the same manner as the training data set, transforming the normalized unknown sample data set into wavelet coefficients using the wavelet transformation technique used for as the training data set, automatically selecting the same desirable wavelet coefficients from the unknown sample data set as were selected for the training data set; and comparing the wavelet coefficients from the unknown sample data set with the classification model using the pattern recognition technique. The system may also include an output device for outputting an identity of the unknown conditions associated with the unknown sample data set.

Another embodiment of the present invention is a sensing system that includes at least one first order sensor, wherein the sensor senses the presence of a condition and produces signal-vector data, an unknown sample data set comprising signal-vector data, including unknown sample data provided by the at least one sensor under unknown conditions, a microprocessor connected with the at least one first order sensor and an outputting device for outputting an identity of the unknown conditions associated with the unknown sample data set. The microprocessor includes a stored classification model previously compiled from a training data set previously collected and software. The software is suitable for each of the following applications: adjusting the unknown sample data to account for variances between background data and the unknown sample data, normalizing the unknown sample data set, transforming the normalized unknown sample data set into wavelet coefficients using a wavelet transformation technique used for the training data set, selecting the same desirable wavelet coefficients from the unknown sample data set as were selected for the training data set using an analysis of variance feature selection technique; and comparing the wavelet coefficients from the unknown sample data set with the classification model using a pattern recognition technique that generated the classification model.

The foregoing and other features and advantages of the present invention will be apparent from the following, more

DETAILED DESCRIPTION OF THE INVENTION

Figure 1:
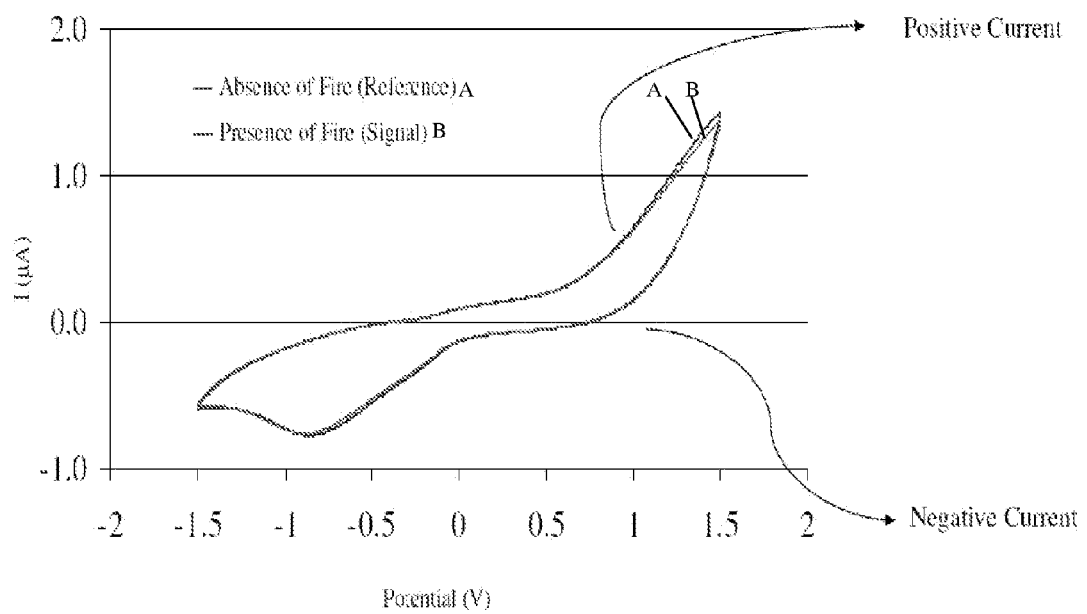
FIG. 1 is an example of two cyclic waveforms provided using cyclic voltammetry.

Preferred embodiments of the present invention are now described with reference to the Figures, in which like reference numerals are generally used to indicate identical or functionally similar elements. Also in the Figures, the left most digit of each reference numeral generally corresponds to the Figure in which the reference numeral appears. While specific details of the preferred embodiments are discussed, it should be understood that this is done for illustrative purposes only. A person skilled in the relevant art will recognize that other configurations and arrangements can be used without departing from the spirit and scope of the invention. It will also be apparent to a person skilled in the relevant art that this invention can also be employed in other applications.

Cermet sensors employ an electrochemical (particularly voltammetric) measurement technique to generate their complex response signal-vector data, generally in the form of cyclic waveforms. Voltammetry involves applying a varying potential (typically a ±triangular waveform) across an electrochemical cell and measuring the resultant current produced. This technique is commonly referred to as "cyclic voltammetry." Other types of sensors or other devices may also use cyclic voltammetry or may utilize other similar methods for producing an output in the form of cyclic waveforms. The cyclical waveform is an example of signal-vector data, wherein the signal data is generated as an information-rich vector rather than merely a data point. The cermet sensor, therefore, is an example of a first order sensor, which is capable of producing signal-vector data.

The present invention is generally directed to a method for analyzing signal-vector data from first order sensors and a sensor system which analyzes signal-vector data via this method. Thus, a cermet sensor is merely a non-limiting example of a first order sensor and a cyclic waveform is merely an example of signal-vector data that may be available therefrom.

In particular, the present invention focuses on using information rich wavelet that are transformed from the signal-vector data, but reducing the wavelet to only the most relevant wavelet coefficients via an automated feature selection technique that is particularly suited for classification purposes. Automated feature selection has an advantage over any other wavelet analysis in that it selects only the most relevant information, increasing accuracy of classification via pattern recognition, which reducing the time and microprocessing requirements needed for the rigorous data analysis of signal-vector data. Thus, smaller and more lightweight field sensors can be made with increased accuracy and reducing microprocessing requirements, which is a particular benefit for sensors used, for example, in public areas or battlefield environments.

FIG. 1 illustrates examples of two cyclic waveforms measured by a single cermet sensor. Each cyclic waveform is an example of the signal-vector data provided by first order sensors, such as the cermet sensor. In particular, FIG. 1 demonstrates an example of a waveform when the current is measured as a function of the voltage (or potential) as the voltage is cycled between −1.5V and 1.5V. The signal-vector data of FIG. 1 are shown for only two different conditions, for example, in the presence of a fire and in the absence of a fire. As is evident from FIG. 1, the waveforms are very similar in visual appearance, and thus rigorous data analysis must be performed to distinguish particular attributes of the signal-vector data. Each waveform includes multiple data points for each voltage sweep over time. Generally, many more than two conditions (such as several types of fire events or the presence of several different analytes) are measured, which can lead to the production of several waveforms, each with a large number of data points. Mere visual inspection of the signal-vector data is rarely sufficient to account for the slight variations in data for the purposes of accurate classification of unknown conditions.

Sensor arrays offer even greater selectivity than single sensors, such that a plurality of sensors is available to sense a particular environment under the same conditions. The use of a plurality of sensors, for example a plurality of cermet sensors with different electrode-electrolyte-electrode configurations, provides different sensing criteria. The combination of data from each sensor produces a signature or fingerprint that is unique for exposure to each of a plurality of conditions. For example, they may provide a signature for each of several different analytes and/or different fire conditions as they are detected by each of the plurality of sensors.

Figure 2:
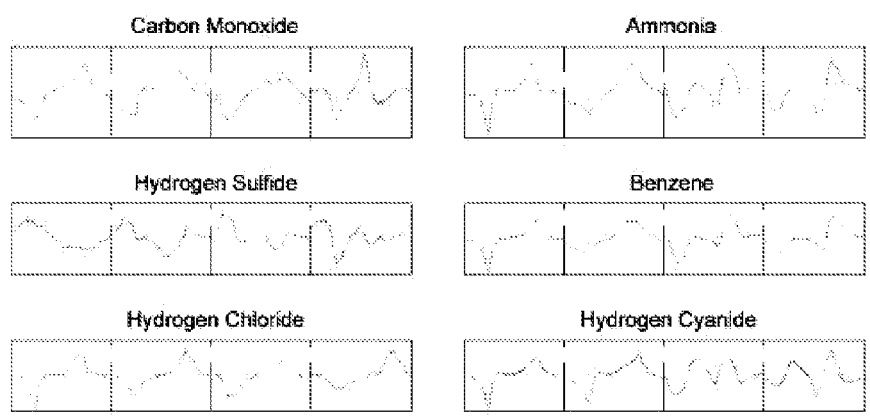
FIG. 2 is a spectrum of normalized waveforms of a variety of analytes from four different cermet sensors displayed end-to-end, with each sensor waveform separated by vertical lines.

FIG. 2 illustrates examples of signature waveforms of a variety of analytes using four different cermet sensors. In this case, four cyclical waveforms, such as those illustrated in FIG. 1 that have been "opened up" (i.e., displayed as a function of time or another characteristic data point) and displayed end-to-end to form a data spectrum. The vertical lines separate the data for each of the four sensors. Additional spectra are illustrated for different conditions in FIGS. 6 and 7. The individual waveforms may be translated into spectra and may be extended to a dyadic length, which is particularly desirable for fast wavelet transformation techniques (discussed in greater detail below).

When a plurality of different cermet sensors are utilized in a sensor array to sense different conditions, an even greater volume of signal-vector data is developed. Thus, signal-vector data can include a large number of data points, which must be distinguished based on the particular condition.

Thus, the present invention is generally directed to a method and system for analyzing the large volume of signal-vector data that is generated from first order sensors, for the particular purpose of classifying the conditions under which the signal-vector data was generated. Generally, this method includes providing a training data set generated from known conditions. For sensing applications, this training data set generally includes both baseline data, or background data, and sample data from a specifically known source under known conditions. In order to characterize only the actual variations of the sample data over the background data, the training data set must first be adjusted. The most simple background adjustment technique is merely subtracting the baseline data from the sample data. Other non-limiting examples of background adjusting techniques include, but are not limited to, baseline adjustment, calculating a slope to remove overall baseline drift and rigorous dynamic background normalization to account for particular locations of substantial baseline drift.

Additionally, the data should be normalized using known normalization techniques. One non-limiting example of a normalization technique is the most common: using the square root of the sum of the squares. For certain sensing applications, these normalization techniques remove certain known variables from consideration, such as concentration and temperature changes, so as to focus the data on merely the presence or absence of a specific material or condition.

Wavelet transformation techniques are then applied to the training data set, which may be presented in as spectra that has been extended to a dyadic length. Various known wavelet transformation techniques may be used, including but not limited to discrete wavelet transformation, particularly a fast wavelet transformation. Daubechies, Haar, Symmlet, and Coiflet are non-limiting examples of wavelets suitable for use in the present invention. A preferred wavelet is the Daubechies 8 technique, which is well known. Wavelet coefficients may not be visually interpretable to an analyst but are an efficient way to express the data in a compressed form that is amenable to mathematical data analysis. The wavelet transform extracts information about signal-vector data within an output response that varies in frequency and is localized in time. In other words, the wavelet coefficients provide information in a different format which is particularly suitable for feature selection and pattern recognition.

A feature selection technique is performed on the wavelet-transformed data, in which particularly significant or relevant wavelet coefficients are selected. The feature selection technique of the present invention is an automated feature selection technique. While several non-automated feature selection techniques may be known, automated feature selection has the benefit of reducing human error in the selection of the most relevant features of wavelet-transformed data, particularly for classification purposes. The preferred automatic feature selection technique of the present invention is the application of analysis of variance (ANOVA) combined with cross-validation for parameter optimization and to minimize error. Cross-validation automatically determines and optimal Fisher-ratio or "f-ratio" threshold value with which the wavelet coefficients are selected.

The training data set then may be used to form a classification model using classifying or pattern recognition techniques. Examples of pattern recognition techniques include but are not limited to linear discriminant analysis, nearest neighbor analysis or the application of a neural network. Preferably, a probabilistic neural network, such as that described in U.S. Pat. Nos. 6,289,328 and 7,034,701, which are incorporated herein by reference in their entirety, is used such that unknown conditions are not only classified, but classified with a level of probability of accuracy. Using a probabilistic neural network, the data is classified by computing the distances of each data point in the model to each data point of the unknown sample data set, also taking into account a probability density function that is superimposed upon each sample data set.

The classification model may be output by a variety of methods, including but not limited to, displaying, printing, storing for further retrieval or processing, making available for download, and/or transmitting the results generated by the equations, the system and methods discussed herein. The present invention also includes any computer systems and computer readable media having programs or applications for receiving, displaying, printing further processing, and transmitting the classification model or information derived therefrom, as well as for making the results available for retrieval by other users.

Via the feature selection techniques of the present invention, large volume of signal-vector data can be analyzed on any computer system, including a small microprocessor, suitable for use in a small a lightweight field sensor device. Without this feature selection technique applied to the wavelet-transformed data, the large volume of the training data, if required to be analyzed in the number of dimensions that would be required with such a condition specific data set, may be too much data for a field microprocessor and instead require the full capabilities of a conventional desktop PC, which would not be suitable for hand-held or battlefield sensing applications.

The same method is also applied to real-time sensing operations. An unknown sample data set can be provided in which the conditions are unknown. The unknown sample data set includes the same signal-vector data from the same first order sensor. The unknown sample data can then be correlated with the training data set so as to identify the unknown conditions. For example, an unknown sample data set may be generated that represents exposure to an unknown analyte. As another example, the unknown sample data set may represent an unknown fire/fire precursor/non-fire condition that is sensed in real-time.

The signal-vector data of the unknown sample data set is treated in the same way as the training data, including background adjustment, normalization and wavelet transformation, using the same techniques applied to the training data set. Then, the same wavelet features that were selected for the training data set are also selected for the unknown sample data set using ANOVA. The unknown sample data set is then compared to the classification model from the training data set via the classifying or pattern recognition technique. The pattern recognition technique then is used to identify the unknown conditions under which the unknown sample data set was prepared. For example, the pattern recognition technique would identify the presence of a particular analyte or indicate whether or not a fire or fire pre-cursor was occurring or not. Again, the probabilistic neural network is the preferred classification or pattern recognition technique, since it provides not only an identity of the unknown condition, but also the probability that the identified condition is accurate.

As with the classification model, the identification of the unknown condition and/or the probability of accuracy of the identified unknown condition may be output by a variety of methods, including but not limited to, displaying, printing, storing for further retrieval or processing, making available for download, and/or transmitting the results generated by the equations, the system and methods discussed herein. The present invention also includes any computer systems and computer readable media having programs or applications for receiving, displaying, printing further processing, and transmitting the identification and/or probability of accuracy of the unknown condition or information derived therefrom, as well as for making the results available for retrieval by other users.

For example, in a real-time sensing application, it may be useful to have an audible or visual alarm when results dictate the presence and/or high probability of a harmful substance or fire. Where probability information exists, the alarm may only occur when the probability exceeds a predetermined percentage. For example, if the probability of a harmful event is greater than 50%, it is more likely than not that the event is occurring. However, for increased certainty, an alarm could be set to active only when higher probabilities, such as 60% or even 90% is exceeded. Knowing the level of certainty allows the analyst to set any probability threshold designed to lower the rate of false alarms.

Examples 1 and 2 below utilize an array of four conventional cermet sensors which have different electrode-electrolyte-electrode configurations to provide slightly different sensing criteria. For example, in Example 1, sensor A is platinum-yttria stabilized zirconia-platinum/palladium (Pt—YSZ—Pt/Pd), sensor B is platinum-yttria stabilized zirconia-platinum (Pt—YSZ—Pt), sensor C is platinum-yttria stabilized zirconia-platinum-tungsten bismuth oxide (Pt—YSZ—Pt—WBO), and sensor D is platinum-yttria stabilized zirconia-platinum/palladium-tungsten bismuth oxide (Pt—YSZ—Pt/Pd—WBO). However, one skilled in the art can appreciate that data from only one sensor or from any plurality of sensors may be analyzed according to the present invention. Further, any data exhibiting such a cyclic waveform under various conditions should be suitable for analysis according to the present invention.

The following examples further describe the system and method of the present invention. In each Example, there generally exists a training step, which includes the collection of a training data set (for example, sensor responses to clean air and known analyte gases or sensors responses under known fire or non-fire conditions). The training data set is then used to generate a classification model. There also exists a prediction step, which includes a measurement of an unknown sample data set collected under unknown conditions (for example, an unknown gas sample is taken or the potential fire conditions of a room are not known). The unknown sample data set is compared via the pattern recognition technique, from which a classification model has been "trained" using the training data set, in order to predict the classification of the unknown sample data set.

EXAMPLE 1

Analyte Sensing for Detection of Particular Chemicals

In this example, the four sensors are exposed to clean air and then to a variety of analytes of interest. Analyte streams were produced by diluting certified gas cylinders of carbon monoxide (CO), nitrogen dioxide (NO2), sulfur dioxide (SO2), hydrogen sulfide (H2S), chlorine (Cl2), hydrogen chloride (HCl) (Air Gas, Los Angeles, Calif.) ammonia (NH3), carbon disulfide (CS2), benzene (C6H6), formaldehyde (HCHO), hydrogen cyanide (HCN) (Tex-La Gas, Sulphur, La.), and cyanogen chloride (CNCl) (HP Gas Products, Baytown, Tex.). Analyte streams of the nerve agent simulants dimethyl methylphosphonate (DMMP), diisopropyl methylphosphonate (DIMP), and 2-chloroethyl ethyl sulfide (CEES) were generated by certified permeation tubes (KIN-TEK, La Marque, Tex.). Various controllers were used such that the flow, temperature, and humidity of the purified air and analyte/air streams to create the known concentration of analyte needed under these known conditions. The sensors were exposed to each of analytes at five different concentrations from low to high, high to low, and low to high, making three replicates of each concentration. A training data set was also collected for two analytes at various temperatures and at various scan rates. The sensors were flash heated to 300° C. between experiments to help clear out any remaining analyte from the sensor and restore it to a clean background condition.

Data is collected during the experiment at a preset data acquisition rate, and with preset cermet sensor parameters (voltage limits, voltage sweep frequency, operating temperature, etc.). This data is collected in the form of one vector sensor current readings per sensing element per voltage sweep cycle, as an example of signal-vector data of the present invention. For the purpose of data analysis, the signal-vector data for each of the four sensing elements are joined end to end. Such an augmented spectrum is collected for each voltage sweep cycle, and these form the rows of the data matrix that is eventually acquired over the duration of the experiment. This data is saved a text file on a workstation PC. However, the data could be saved in a variety of ways on a variety of computer systems or memory devices.

The training data set was collected at 2 mV intervals resulting in at least about 3000 points for each cyclic waveform and greater than about 12,000 points for cyclic waveforms from all four sensors. For each 5 min cycle, about 20 cyclic waveforms were collected with about the last 10 cyclic waveforms of each air/analyte run used in the analysis to allow for a complete exchange in the chamber and the sensor to reach a steady state. A matrix of about 10×12,000 was used from each initial clean air exposure of each analyte to model the background.

In particular, a row of the data matrix (or, alternatively, an average of multiple rows) corresponding to a measurement taken from clean air is subtracted from each remaining row of the training data set matrix, forming a new matrix of background-subtracted data. Following this, the data is then normalized on a row-wise basis using the square root of the sum of the squares of each row as the normalizing factor (i.e., the Euclidean norm). Normalization makes the patterns observed for each analyte gas mostly invariant with respect to concentration.

The data is imported into a MATLAB program, specifically MATLAB, version 7.0 (Mathworks, Inc., Natick, Mass.). MATLAB is a computational environment that can be facilitated on a conventional workstation PC or microprocessor. When the training data set was background subtracted about a 30×12,000 matrix for the three replicates of each concentration was generated. A data matrix of about 2400×12,000 were generated using the data collected (150 air, 150×15 analyte). FIG. 2 shows examples of the information rich sensor waveforms.

Figure 3:
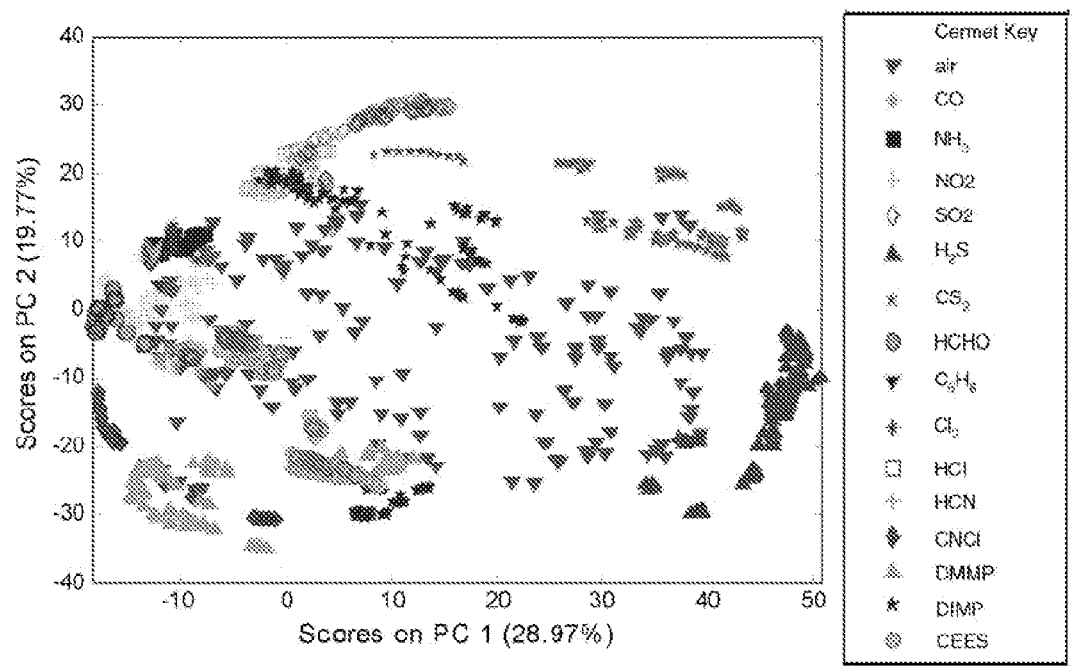
FIG. 3 is a principal component analysis plot of a training data set for various analytes with a background air pattern therethrough.

Principal component analysis was used merely to provide an interpretable view (or graphical display) of the multidimensional data space. However, principal component analysis was also used for comparison purposes to demonstrate the advantage of the present invention over other data analysis techniques, as discussed in further detail below. The MATLAB routines used for principal component analysis were provided in the PLS Toolbox, version 3.0.4 (Eigenvector Technologies, Inc., Manson, Wash.). FIG. 3 shows a principal component analysis plot of the training data set using the first two principal components which accounts for 49% of the variance in the training data. For the principal component analysis, the data was made more manageable by averaging every 10 points to reduce the data from about a 12,000 point vector to about a 1200 point vector. The 2400×1200 matrix was then autoscaled (mean center, unit variance) and principal component analysis was used to reduce the dimensionality of the data from 1200 down to 7 while maintaining 85% of the variance.

Following normalization, wavelet transformation was also used. A wavelet transformation technique is row-wise applied to the normalized training data set. The wavelet transformation technique used in this example is discrete wavelet transformation. The discrete wavelet transformation is a fast wavelet transformation. In this case, "Daubechies 8" was the preferred wavelet. However, other wavelet transformation techniques and/or other wavelets may be selected for use in the present invention, as would be apparent to one skilled in the art. The particular choice of wavelet transformation technique to use will depend on the signal characteristics of the measured data. The Daubechies wavelet is commonly used in similar applications and is well suited to describing the broad features located in the spectra output by a cermet microsensor array. However, as previously discussed, prior to transformation, the spectra from each sensing element are separated and extended to dyadic length as required by the fast wavelet transform algorithm of Daubechies 8. As such, the waveform was reduced from 12,000 to 1024 points. After wavelet transformation, a wavelet-transformed training data matrix is developed of the same size as the normalized training data matrix, but with wavelet coefficients occupying the rows rather than time-dependant current measurements. For an example of the effects of wavelet transformation see FIGS. 8A and 8B of Example 2.

Algorithm implementations utilized for wavelet transformation of the training data set are taken from the WaveLab toolbox for MATLAB (particularly WaveLab802), which is available from Stanford University (http://www-stat.stanford.edu/~wavelab/). Wavelet transformation of cermet microsensor array data provides two principal advantages: data compression and the ability to apply enhanced feature selection. A wavelet transformation takes data from a time domain to a scale-dependant frequency domain. Varying this scale allows for a series of wavelet coefficients to describe frequency-based features in the data that are also localized at specific times.

Further data compression is achieved by selectively filtering out coefficients from the wavelet transform that contain little or no signal. Feature selection is achieved by locating coefficients that contain information relevant to a desired classification. The wavelet coefficients are automatically processed in order to select for relevant features. Coefficients that are less than an optimized threshold in every spectrum are automatically discarded. In this example, an analysis of variance (ANOVA) calculation is performed column-wise on the wavelet coefficients in order to locate coefficients that are effective at discriminating between different analyte gases.

ANOVA examines the inter- and intra-class variance between the data for the various analytes. As the training data set is generated using known gas analytes, it is known which analyte gas corresponds to each row of the wavelet-transformed data matrix. The value calculated by the ANOVA equation is a Fischer-ratio or an "f-ratio", which is the ratio of the variance observed over the measurements of different analytes to the variance observed in the measurement of only one analyte. The magnitude of the f-ratio provides an indicator of class separation for each calculated wavelet coefficient over the wavelet-transformed data matrix. Data that produce an f-ratio greater than a set threshold are retained as features while the remaining data are discarded. The threshold selected is one that provides the greatest between class variance when compared to the variance within a class. This threshold is determined through cross-validation to maximize correct classification by optimizing the classifier's performance. The set of wavelet coefficients thus chosen comprises the set of selected features to be used in subsequent classification of unknown gas samples. As one mode of output, the waveform data can then be reconstructed using the selected coefficients.

Figure 4:
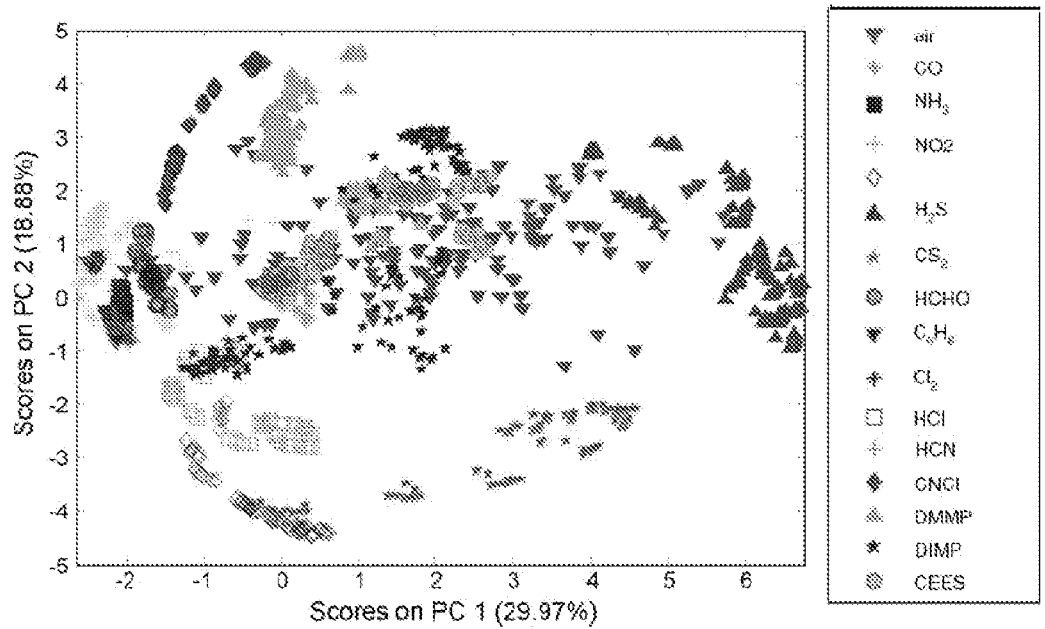
FIG. 4 is a principal component analysis plot of a wavelet transformed training data set.

Using ANOVA, the wavelet-transformed training data set was then reduced to 18 wavelet coefficients. FIG. 4 shows a principal component analysis plot of the wavelet-transformed data.

The MATLAB script for ANOVA calculation is a custom implementation by personnel at the Naval Research Laboratory. Attached at the end of this specification is the particular MATLAB script used for the ANOVA calculations in the examples herein.

Next, the known analyte feature-selected wavelet coefficients are used to build a classification model. The function of the classifier is to provide an optimized decision regarding sample classification when presented with new data. For comparison purposes, two different types of classifiers were used in this example, a known probabilistic neural network (PNN) developed at the Naval Research Laboratory and linear discriminant analysis (LDA) based on the Mahalanobis distance metric, both with good results. Other types of classifiers or pattern recognition techniques may be utilized, including, but not limited to, conventional nearest neighbor analysis.

Generally, supervised training classification techniques use training data sets to develop classification rules. The rules predict classification of future unknown sample data sets. Given both the unknown sample data sets and the classification model results, the classifier, or pattern recognition technique, generates mathematical functions to define the classes. Contiguous block cross-validation, testing all the replicates of each concentration level, was used for classification analysis. In this example, all patterns at a given concentration are withheld from the training data set being classified.

An unknown sample data set is generated in the same manner as the training data set. The unknown sample data set is normalized in the same row-wise fashion as the training data set (i.e., the unknown sample data set is background subtracted and then normalized by the Euclidean norm). The same wavelet transformation technique as used previously for the training data set is row-wise applied to the unknown sample data set. The same feature-selected wavelet coefficients are extracted as for the training data set. These feature-selected wavelet coefficients are then presented to the classification model generated from the training data set for sample analyte identification.

The results from Example 1 demonstrate the improvement over other method for data analysis conventionally used, which do not incorporate wavelet transformation and feature selection techniques. For example, Table 1 shows the results using the probabilistic neural network pattern recognition technique, where principal component analysis was used for data reduction rather than wavelet transformation. Table 2 shows the results using the linear discriminant analysis pattern recognition technique, where principal component analysis was used for data reduction rather than wavelet transformation. The overall correct classification for all five concentrations is 88/90%, respectively. The poorest performances are observed for the initial run of the lowest concentrations through the sample chamber.

Meanwhile, Table 3 shows the results using the probabilistic neural network pattern recognition technique, where wavelet transformation and feature selection techniques were used. Table 4 shows the results using the linear discriminant analysis pattern recognition technique, where wavelet transformation and feature selection techniques were used. The overall classification for all five concentrations is 94/93%, respectively, which is a significant improvement over the methods of Tables 1 and 2, with probabilistic neural network demonstrating slight improvement over linear discriminant analysis.

Improvements have been demonstrated in extracting the relevant information for selection identification of a variety of analytes with the data analysis method of the present invention. The use of wavelet transformation and feature selection techniques provided improved classification. All of the vapors of interest are readily detected at the threshold limit value, which indicates when safe levels of exposure to various hazards have been exceeded. These data analysis methods show much promise for selective detection of a wide variety of vapors, particularly as improvements continue to be made in the cermet sensors themselves.

EXAMPLE 2

Sensing for Fire Detection Under Different Conditions

Instead of sensing analytes for the detection of particular chemicals, cermet sensors were also used to detect fire or pre-cursors of a fire under various conditions using the data analysis methods of the previous invention as demonstrated by Example 1.

In both laboratory and shipboard environments, fire and nuisance sources were created to expose the detection systems to a range of potential shipboard scenarios. For example, the following fire sources were used in this example either in the laboratory environment, in the shipboard environment or in both environments: flaming cardboard box (with and without polystyrene pellets therein), flaming trash can, flaming shipping supplies, flaming mattress and bedding, flaming IPA spill, flaming heptane pan, flaming diesel-soaked rags, smoldering bag of trash, smoldering mattress and bedding, smoldering cable bundle, smoldering laundry, smoldering oily rags, heated painted bulkhead, IPA pan in the interior of a cabinet and smoldering computer monitor. The following nuisance sources were used in this example either in the laboratory environment, in the shipboard environment or in both environments: torch cut steel, cutting steel, welding, grinding painted steel, normal toasting of bread at the darkest setting, engine exhaust, grinding cinder block, spray aerosol, spilling metal bolts, space heater and heat gun. Thus, a training data set was generated for each of the fire sources and nuisance sources under a variety of controlled conditions. Small fires were used to challenge the detection systems and to provide performance results for early detection.

The same array of four sensors was used in the laboratory environment. However, in the shipboard environment, Sensor C and Sensor D were replaced with platinum-tungsten bismuth oxide-yttria stabilized zirconia-platinum (Pt—WBO—YSZ—Pt) and platinum-tungsten bismuth oxide-yttria stabilized zirconia-platinum/palladium (Pt—WBO—YSZ—Pt/Pd) sensors, respectively. The use of different sensors in the various environments illustrates that the type or number of sensors utilized is not critical to the data analysis performed by the methods of the present invention. In fact, the present invention is suitable for classifying signal-vector data from a variety of sensors.

The primary data acquisition system was started and allowed to collect background data for a minimum of 300 seconds. After the background data was collected, the fire or nuisance source was initiated and allowed to continue until fully consumed or until all systems were in alarm or showed no change in detection due to quasi-steady state conditions. Waveform sample data sets, such as those shown in FIG. 1, for the background and each fire and nuisance source was logged to an ASCII text file in comma separated values (CSV) format, which can be readily imported into common spreadsheet applications and saved on a conventional microprocessor.

In both the laboratory and shipboard environments, the training data set was designed to provide a range of fires sources, source locations, and ventilation conditions to comprehensively evaluate the detection systems against likely shipboard fire scenarios. The data was collected at 8 mV intervals resulting in 750 points for each voltammogram with a total of 3000 points for all four sensors.

Figure 5:
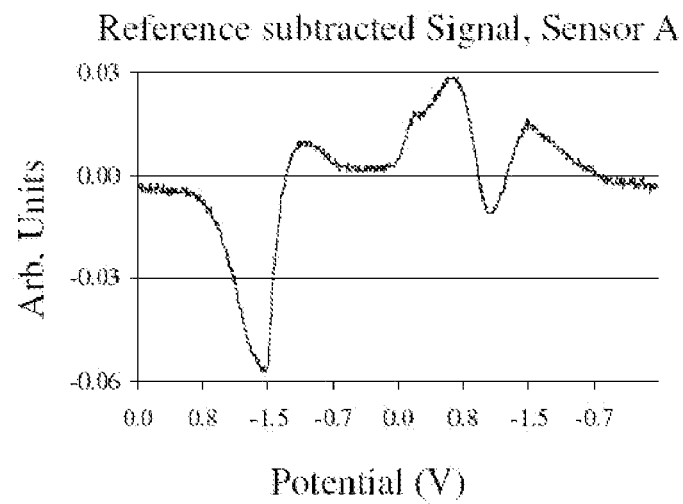
FIG. 5 is a normalized waveform of a flaming fire from a single sensor (Sensor A).
Figure 6:
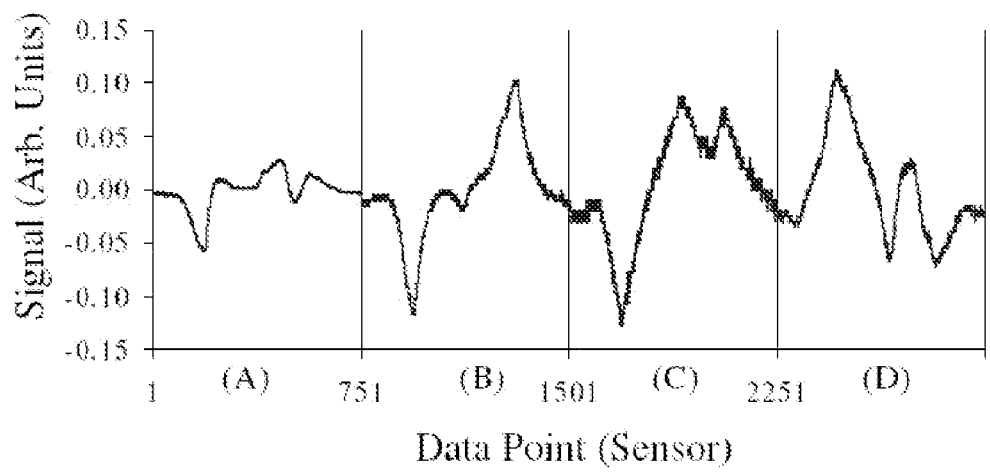
FIG. 6 is a spectrum of normalized waveforms from the same flaming fire of FIG. 5 for four sensors (Sensors A-D) displayed end-to-end, with each sensor waveform separated by vertical lines.
Figure 7:
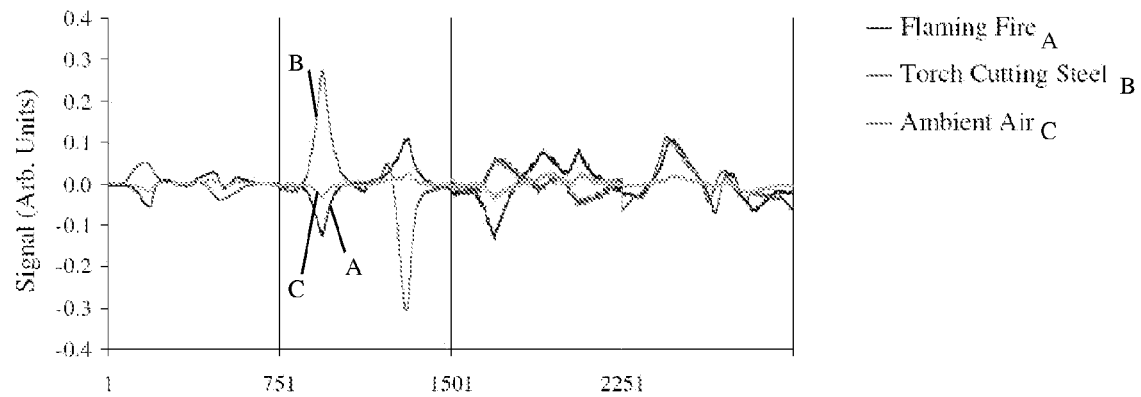
FIG. 7 is spectra of normalized waveforms from four sensors (Sensors A-D) displayed end-to-end, with each sensor waveform separated by vertical lines of various source-types including flaming fire, torch cutting steel and ambient air.

The data was background subtracted using the five waveforms generated prior to ignition. FIG. 5 is an example of a waveform from one sensor (Sensor A) that has been "opened up" with the background information subtracted. In particular, FIG. 5 is a waveform generated from sensing a flaming fire. FIG. 6 is a spectrum including the waveform from FIG. 5 (Sensor A), along with the waveforms from the other three sensors (Sensors B-D), for the flaming fire displayed end-to-end, with vertical lines separating the sensors. FIG. 7 shows spectra from all four sensors (Sensors A-D) generated from each of a flaming fire (same as FIG. 6), torch cutting steel, and ambient air. As seen in FIG. 7, it can be difficult to distinguish the waveforms for the various sources using only visual analysis.

Figure 8A:
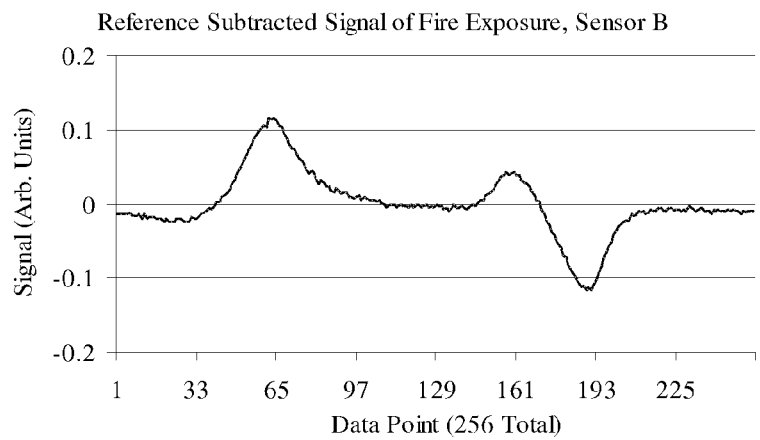
FIG. 8A is a waveform for a fire source taken from a single sensor (Sensor B).
Figure 8B:
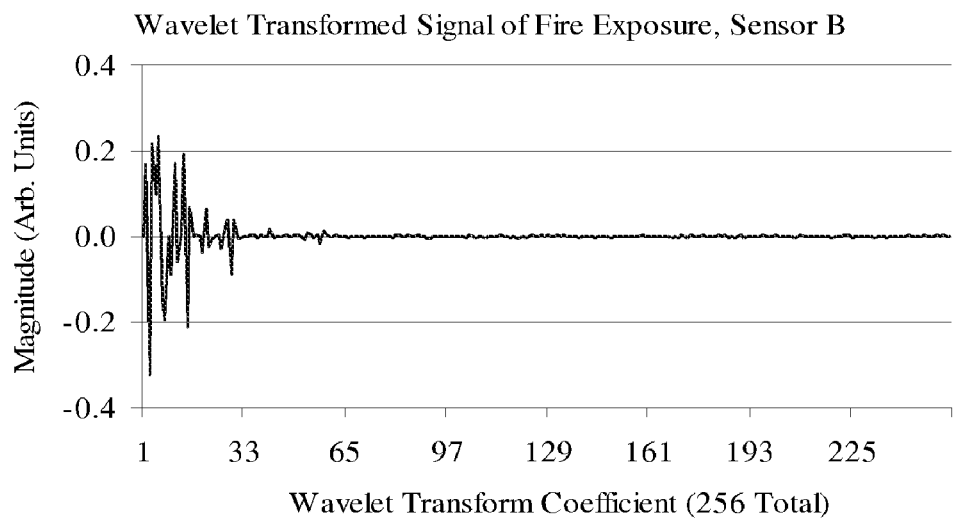
FIG. 8B illustrates the wavelet transformed data from the waveform of FIG. 8A.

As with Example 1, a Daubechies 8 wavelet function was chosen for this example. As such, the waveform was expanded from 3000 to 4096 points. FIG. 8A is an example of a waveform taken from one sensor (Sensor B). FIG. 8B illustrates the wavelet transformed from the waveform of FIG. 8A. Thus, the amount of significant data is reduced to only the beginning portion of the wavelet.

Figure 9:
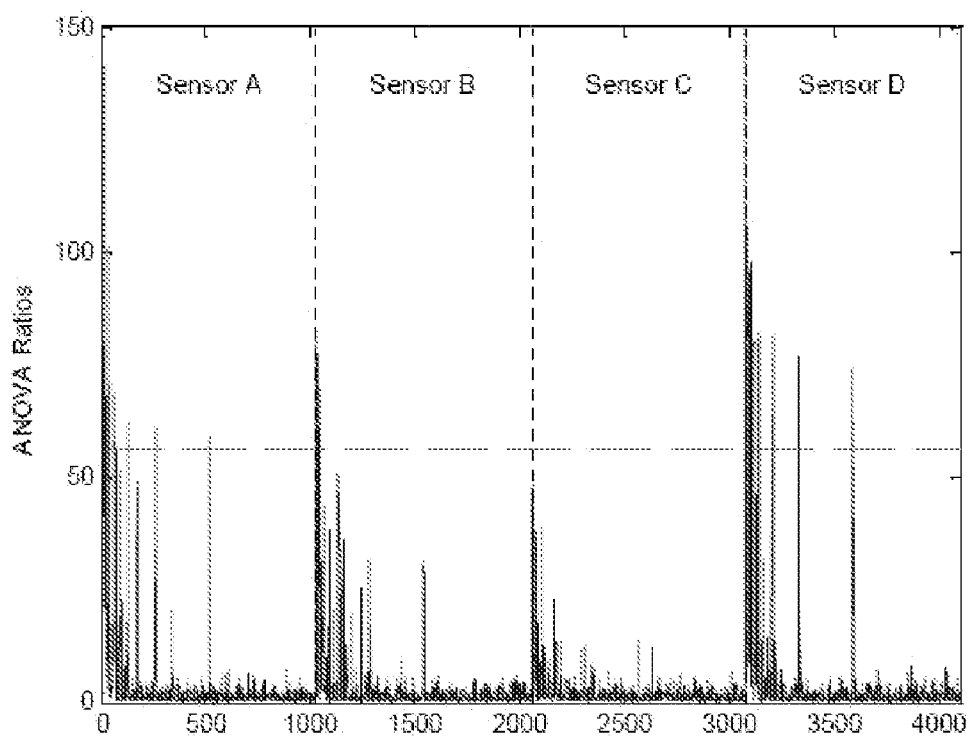
FIG. 9 illustrates ANOVA ratios used to determine which wavelet coefficients are to be used for feature selection.
Figure 10:
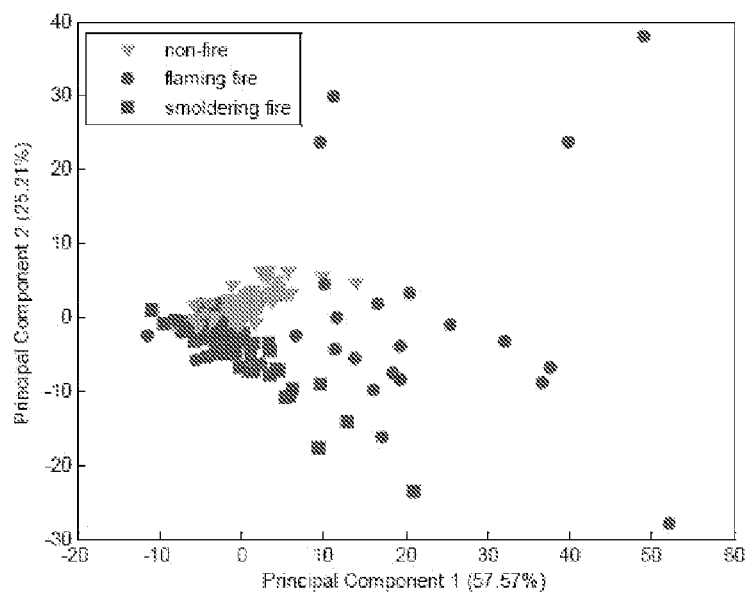
FIG. 10 is a principal component analysis plot of the training data set of FIG. 9 after feature selection accounting for 83% of the variance in the data.

An analysis of variance (ANOVA) was used to select down the total wavelet coefficients to only 64 wavelet coefficients. The training data set was divided into three classes: non-fires, flaming fires and smoldering fires. The fires were split into two categories so that differences between flaming and smoldering fires could be maintained in the data space. FIG. 9 shows the ANOVA ratios used to determine which coefficients were used. FIG. 10 shows a principal component analysis plot of the training data set using the first two principal components which accounts for 83% of the variance in the data.

Figure 11:
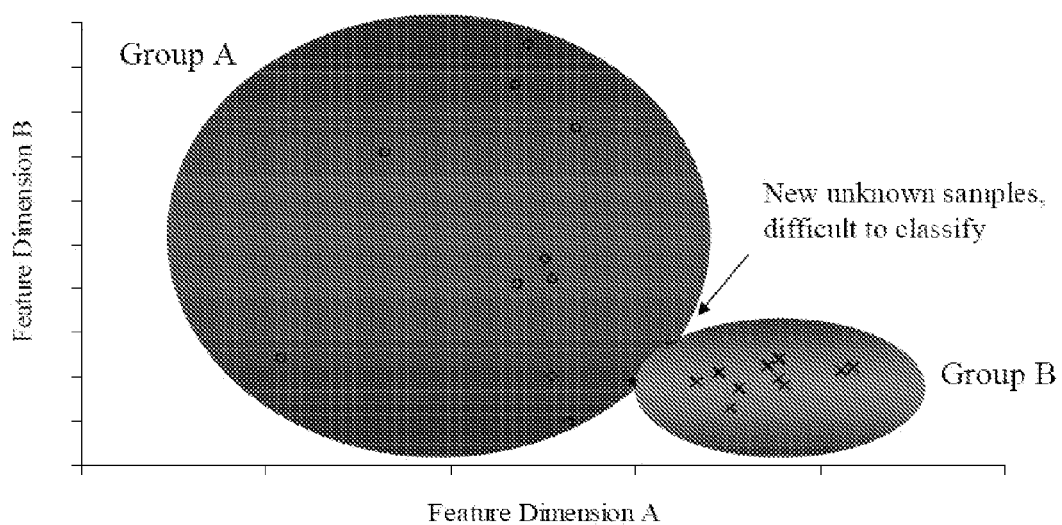
FIG. 11 is a scatter plot of two classes of data (Group A, identified by Os, and Group B, identified by Xs) which may correspond to fire/non-fire conditions, displayed in two-dimensional feature space using the methods of the present invention.
Figure 12:
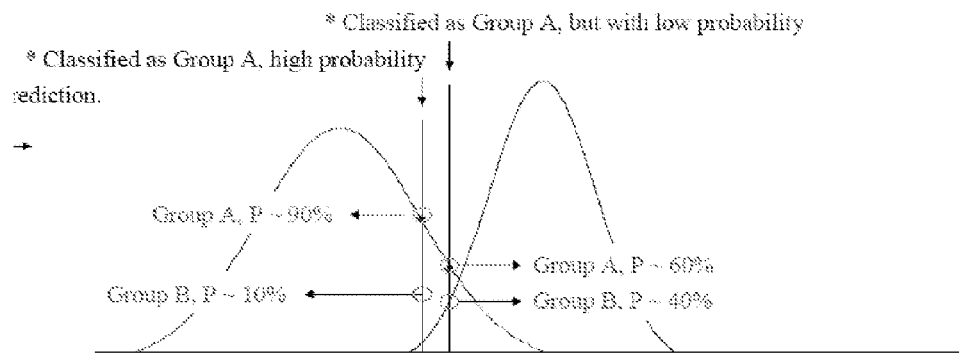
FIG. 12 graphically illustrates the probability that the unknown samples illustrated in FIG. 12 are either Group A or Group B.

The probabilistic neural network computes the probability that allows a level of certainty to be associated with the prediction. FIG. 11 is a scatter plot of two classes of data (Group A, identified by Os, and Group B, identified by Xs), which may correspond to fire/non-fire conditions, displayed in two-dimensional feature space. With only visual analysis, unknown sample data sets may be displayed very close to where the two Groups overlap, thus making it difficult to accurately classify the unknown samples. However, using the probabilistic neural network, a probability is assigned to each unknown sample data set. FIG. 12 graphically illustrates the probability that the unknown samples illustrated in FIG. 11 are either Group A or Group B. Specifically it shows that one unknown sample (the left hand vertical line) has a 90% probability of being Group A (a fire) and only a 10% probability of being Group B (non-fire). Thus, there is a high probability that the unknown sample is a Group A sample, or a good indication of a hazardous fire event. The other unknown sample (the right hand vertical line) has a 60% probability of being Group A (a fire) and a 40% probability of being Group B (non-fire). Thus, there is a better chance that the unknown sample represents fire than non-fire conditions, but with less certainty than the first unknown sample. False alarms can be reduced by changing the probability threshold for sounding alarms based on the knowledge provided by the data analysis methods of the present invention.

For the laboratory environment, the waveform data from the first 47 tests, when the sensors were clustered together, was used to build a training data set. Waveform data from the next 58 tests were used as unknown sample data sets. From the unknown sample data sets a probability cutoff of 90% was seen as giving the best fire classification.

The cermet sensors were able to pick up most of the fires that were tested, especially the smoldering fires. Table 5 represents the percent of correct classification of each source type for the laboratory environment. Table 6 represents the percent correct classification of each system by source type for the shipboard environment. The percent correct classification represents the number of sources the system correctly classified. It should be noted that when calculating the percent of correctly classified nuisance alarms the number of times a given system did not alarm divided by the number of nuisance sources tested results in the percent correct classification. Overall the results show that data from the cermet sensors could be used to provide good results for classifying fire conditions using the methods of the present invention.

The data analysis methods were run in near real-time. The fires were monitored as they occurred by running the algorithm on the sample data sets as they were being saved. Thus, the method of the present invention may be incorporated into the data collection software to form a system for analyzing data for signal-vector data as it is generated. Further, the present invention may be utilized in real-time in various applications.

The training data set may be collected and the classification model prepared on a conventional computer or PC. The classification model could then be saved or uploaded to a microprocessing system associated with a sensor device incorporating the sensors as well as the software programs for the method of the present invention. Thus, only raw data from the unknown sample data sets need be loaded in the microprocessor for analysis, while the larger volume of raw data for the training data set could remain stored on the desktop computer or PC. Thus, the sensor device can be made very small and lightweight.

Instrumental drift associated with first order sensors or changes in the sampling environmental may cause future data to be sufficiently different from the training data set such that a new unknown same data may be misclassified or even lie entirely outside the classification model. Thus, the present invention contemplates the prudent (and often necessary) periodic update of the classification model with new training data sets. Since the generation of training data sets is generally costly in terms of time and effort, classification models may be updated by comparison of with only "clean air" or "background" data or with comparison of training data sets from only one source. For updating data associated with fire detection, the use of ammonia as a source could be used to calibrate and monitor the effectiveness of the sensors and training data sets, without having to reenact fire/non-fire conditions in order to update the training set data.

Figure 13:
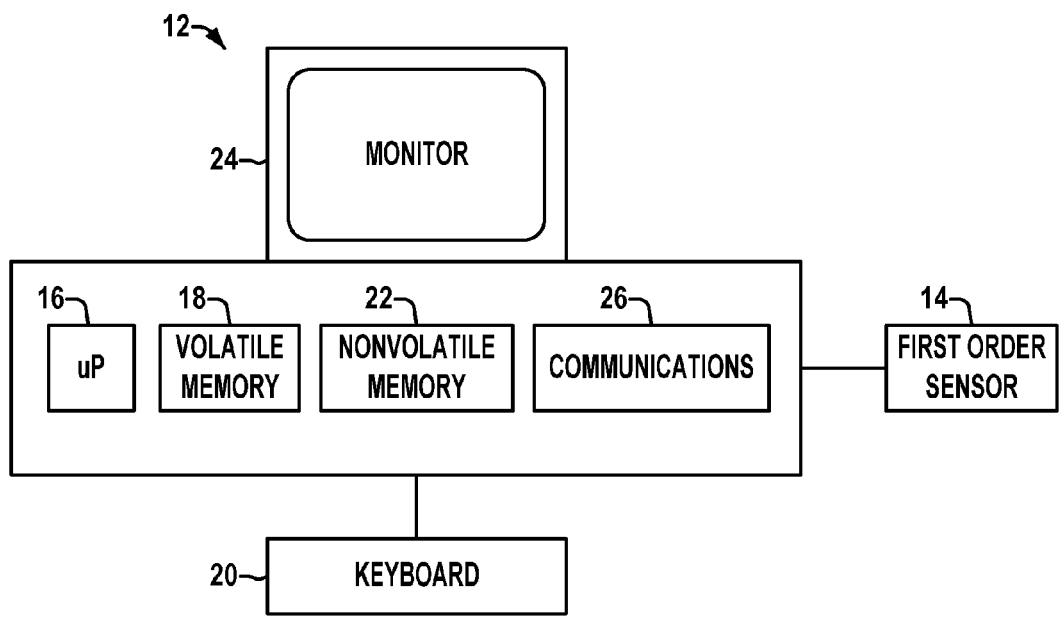
FIG. 13 is a schematic diagram illustrating an exemplary sensing system including a 1st order sensor and a computer system connected with the sensor.

The present invention contemplates the use of computer software and computer programs, as well as computer systems and computer readable media having programs for implementing the methods discussed above. With reference to FIG. 13, a sensor system 10 includes a computer system 12 and, in some embodiments, at least one first order sensor 14. The computer system 12 is generally applicable for the various embodiments described according to the present invention. That is to say, using the various embodiments according to the present invention, the computer system 12 can be employed to generate a classification model from training data, optionally generated by the at least one first order sensor 14, and/or to identify unknown sample data, optionally generated by the at least one first order sensor 14. The computer system 12 may but need not include any of the following: a processor or microprocessor 16, a volatile memory 18, e.g., RAM, an input device 20, e.g., a keyboard, a pointing device and a mouse, a nonvolatile memory 22, e.g., ROM, hard disk, floppy disk, CD-ROM, and DVD, and a output device 24, such as a printer or display, e.g., a display screen. Memory can store program instructions that are executable by a processor to implement various embodiments of the method in accordance with the present invention. Memory can store the results of the computer-based methods discussed above for future retrieval and/or further processing. A communications device 26 may also be connected to enable information exchange between the computer system 12 and other output devices (not shown), such as a printer, or another computer system.

It should be understood that the term "computer system" is intended to encompass any device having a processor or microprocessor that executes instructions from a memory medium. The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include but are not limited to FORTRAN, XML, C++ objects, Java and Microsoft Foundation Classes (MFC).

"Outputting" is contemplated to include methods of receiving, displaying, printing, storing for further retrieval or processing, making available for download, and/or transmitting the results generated by the equations, the system and methods discussed herein. The present invention further contemplates computer systems and computer readable media having programs, applications and/or output or communication devices for receiving, displaying, printing, further processing, and transmitting the results or information derived from the results, as well as for making the results available for retrieval by other users.

While the invention has been particularly shown and described with reference to preferred embodiments thereof, it will be understood by those skilled in the art that they have been presented by way of example only, and not limitation, and various changes in form and details can be made therein without departing from the spirit and scope of the invention. Thus, the breadth and scope of the present invention should not be limited by any of the above-described exemplary embodiments, but should be defined only in accordance with the following claims and their equivalents. Additionally, all references cited herein, including issued U.S. patents, or any other references, are each entirely incorporated by reference herein, including all data, tables, figures, and text presented in the cited references. Also, it is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

The following is the ANOVA scripts used in MATLAB in the Examples herein:

```
function [tmatrix] = varcor5(matrix,classes,threshold)
% Analysis of Variance (ANOVA) based feature selection algorithm,
% calculates ratio of estimated total variance to estimated within
% class variance.
%
% Input is the data, with each row vector representing a different sample,
% a vector of integer class identifiers, one for each row of "data", and
% "threshold", the f-ratio threshold for defining features
%
% Calculated is a vector consisting of an ANOVA f-ratio for each
% column of "data" This ratio indicates the ability of that variable to
% describe class to class differences in the data set examined.
%
% Output is a matrix of features (i.e. columns) from "data" that
% have an ANOVA f ratio higher than "threshold" The matix has the
% same number of rows as "data"
%
% If no threshold is specified, the ANOVA f ratios themselves are
% output instead
%
% Choice of threshold can be optimized by applying varying threshold
% values followed by subsequent chemometric analysis of extracted
% features from a training set (Chemom. Intell. Lab Sys. 2002, 60, 225-237)
%
% I/O:    [features]=varcor5(data,classes,threshold);
%         [ratios]=varcor5(data,classes);
% calculate statistical parameters
dftot=size(matrix,1)-1;
sstot=((std(matrix)).^2)*dftot;
totmean=mean(matrix);
numvars=size(matrix,2);
maxc=max(classes);
dfcl=maxc-1;
dferr=dftot-dfcl;
% examine vector of class identifiers
for k=1:maxc,
    eval(['cvecs{'int2str(k)'}=find(classes==k);']);
end
for j=1:maxc,
    numclass(j)=length(cvecs{j});
end
% calculate within-class sum of squares
    for l=1:maxc,
        cmean(l,:)=sum(matrix(cvecs{l},:))./numclass(l);
    end
    cmean=cmean-repmat(totmean,maxc,1);
    cmean=cmean.^2;
    cmean=cmean.*repmat(numclass',1,numvars);
    sscl=sum(cmean);
% calculate class to class sum of squares
sserr=sstot-sscl;
% calculate ANOVA f ratio
% (ratio of within class variance to class to class variance)
ratios=(sscl/dfcl)./(sserr/dferr);
if nargin==3
    % extract features
    feats=find(ratios>threshold);
    tmatrix=matrix(:,feats);
else
    %output ratios instead
    tmatrix=ratios;
end
```

TABLE 1

| PNN | 10% TLV | 25% TLV | 50% TLV | 100% TLV | 200% TLV | % Correct |
|---|---|---|---|---|---|---|
| CO | 0 | 100 | 100 | 100 | 100 | 80 |
| $NH_3$ | 100 | 100 | 100 | 100 | 100 | 100 |
| $NO_2$ | 100 | 100 | 100 | 100 | 100 | 100 |
| $SO_2$ | 70 | 100 | 100 | 100 | 100 | 94 |
| $H_2S$ | 100 | 100 | 100 | 100 | 100 | 100 |
| $CS_2$ | 70 | 100 | 100 | 100 | 100 | 94 |
| HCHO | 10 | 100 | 100 | 100 | 100 | 82 |
| $C_6H_6$ | 00 | 100 | 100 | 100 | 100 | 80 |
| $Cl_2$ | 10 | 100 | 100 | 100 | 100 | 82 |
| HCl | 100 | 100 | 100 | 100 | 100 | 100 |
| HCN | 70 | 100 | 100 | 100 | 100 | 94 |
| CNCl | 10 | 100 | 100 | 100 | 100 | 82 |
| DMMP | 100 | 100 | 100 | 100 | 100 | 100 |
| DIMP | 0 | 0 | 100 | 100 | 100 | 60 |
| CEES | 80 | 0 | 100 | 100 | 100 | 76 |
| | | | | | Overall | 88 |

TABLE 2

| LDA | 10% TLV | 25% TLV | 50% TLV | 100% TLV | 200% TLV | % Correct |
|---|---|---|---|---|---|---|
| CO | 100 | 100 | 100 | 100 | 100 | 100 |
| $NH_3$ | 100 | 100 | 100 | 100 | 100 | 100 |
| $NO_2$ | 100 | 100 | 100 | 100 | 100 | 100 |
| $SO_2$ | 0 | 100 | 100 | 100 | 100 | 80 |
| $H_2S$ | 100 | 100 | 100 | 100 | 100 | 100 |
| $CS_2$ | 100 | 100 | 100 | 100 | 100 | 100 |
| HCHO | 100 | 100 | 100 | 100 | 100 | 100 |
| $C_6H_6$ | 0 | 100 | 100 | 100 | 100 | 80 |
| $Cl_2$ | 80 | 100 | 100 | 100 | 80 | 92 |
| HCl | 100 | 100 | 100 | 100 | 100 | 100 |
| HCN | 80 | 100 | 100 | 100 | 100 | 96 |
| CNCl | 100 | 100 | 100 | 100 | 100 | 100 |
| DMMP | 0 | 0 | 100 | 100 | 100 | 60 |
| DIMP | 0 | 0 | 100 | 100 | 100 | 60 |
| CEES | 100 | 40 | 100 | 100 | 100 | 88 |
| | | | | | Overall | 90 |

TABLE 3

| PNN | 10% TLV | 25% TLV | 50% TLV | 100% TLV | 200% TLV | % Correct |
|---|---|---|---|---|---|---|
| CO | 100 | 100 | 100 | 100 | 100 | 100 |
| $NH_3$ | 100 | 100 | 100 | 100 | 100 | 100 |

TABLE 3-continued

| PNN | 10% TLV | 25% TLV | 50% TLV | 100% TLV | 200% TLV | % Correct |
|---|---|---|---|---|---|---|
| NO₂ | 100 | 100 | 100 | 100 | 100 | 100 |
| SO₂ | 100 | 100 | 100 | 100 | 100 | 100 |
| H₂S | 100 | 100 | 100 | 100 | 100 | 100 |
| CS₂ | 80 | 100 | 100 | 100 | 100 | 96 |
| HCHO | 100 | 100 | 100 | 100 | 100 | 100 |
| C₆H₆ | 00 | 100 | 100 | 100 | 100 | 80 |
| Cl₂ | 40 | 100 | 100 | 100 | 100 | 88 |
| HCl | 100 | 100 | 100 | 100 | 100 | 100 |
| HCN | 80 | 100 | 100 | 100 | 100 | 96 |
| CNCl | 100 | 100 | 100 | 100 | 100 | 100 |
| DMMP | 100 | 100 | 100 | 100 | 100 | 100 |
| DIMP | 0 | 0 | 100 | 100 | 100 | 60 |
| CEES | 40 | 90 | 100 | 100 | 100 | 86 |
| | | | | | Overall | 94 |

TABLE 4

| PNN | 10% TLV | 25% TLV | 50% TLV | 100% TLV | 200% TLV | % Correct |
|---|---|---|---|---|---|---|
| CO | 100 | 100 | 100 | 100 | 100 | 100 |
| NH₃ | 100 | 100 | 100 | 100 | 100 | 100 |
| NO₂ | 100 | 100 | 100 | 100 | 100 | 100 |
| SO₂ | 100 | 100 | 100 | 100 | 100 | 100 |
| H₂S | 100 | 100 | 100 | 100 | 100 | 100 |
| CS₂ | 30 | 100 | 100 | 100 | 100 | 86 |
| HCHO | 100 | 100 | 100 | 100 | 100 | 100 |
| C₆H₆ | 50 | 100 | 100 | 100 | 100 | 90 |
| Cl₂ | 100 | 100 | 100 | 100 | 100 | 100 |
| HCl | 100 | 100 | 100 | 100 | 100 | 100 |
| HCN | 90 | 100 | 100 | 100 | 100 | 98 |
| CNCl | 100 | 100 | 100 | 100 | 100 | 100 |
| DMMP | 20 | 10 | 100 | 100 | 100 | 66 |
| DIMP | 0 | 80 | 100 | 100 | 100 | 76 |
| CEES | 30 | 30 | 100 | 100 | 100 | 72 |
| | | | | | Overall | 93 |

TABLE 5

| Event Type | Percentage of Correct Classification (Laboratory) |
|---|---|
| Flaming | 88% |
| Smoldering | 100% |
| Nuisance | 33% |

TABLE 6

| Event Type | Percentage of Correct Classification (Shipboard) |
|---|---|
| Flaming | 85% |
| Smoldering | 74% |
| Nuisance | 63% |

What is claimed as new and desired to be protected by Letters Patent of the United States is:

1. A method of analyzing signal-vector data from at least one first order sensor, comprising:
   providing a training data set that includes signal-vector data from at least one first order sensor, wherein the training data set includes background data and sample data collected under known conditions;
   adjusting the sample data of the training data set to account for variations between the background data and the sample data using a background adjustment technique;
   normalizing the training data set;
   transforming the normalized training data set into wavelet coefficients using a wavelet transformation technique;
   using an automated analysis of variance feature selection technique to automatically select desirable wavelet coefficients for classification;
   using a pattern recognition technique to classify the training data set; and
   outputting a classification model generated from the pattern recognition technique.

2. The method of claim 1, wherein the signal-vector data is a cyclic waveform.

3. The method of claim 2, wherein the cyclic waveform is generated from cyclic voltammetry.

4. The method of claim 1, wherein the wavelet transformation technique is selected from the group consisting of Daubechies wavelet transformation, Haar wavelet transformation, Symmlet wavelet transformation, and Coiflet wavelet transformation.

5. The method of claim 4, where in the normalized training data set is transformed using Daubechies wavelet transformation.

6. The method of claim 1, wherein the sample data is adjusted using one or more background adjustment techniques selected from the group consisting of slope calculation and subtraction, background subtraction and dynamic background normalization.

7. The method of claim 6, wherein the sample data is adjusted by background subtraction.

8. The method of claim 1, wherein the training data set is normalized using the square root of the sum of the squares technique.

9. The method of claim 1, wherein the pattern recognition technique is selected from the group consisting of application of a neural network, linear discriminate analysis and nearest neighbor analysis.

10. The method of claim 9, wherein the pattern recognition technique is a probabilistic neural network.

11. The method of claim 1, wherein the sensor is a cermet sensor.

12. The method of claim 1, wherein the automated analysis of variance feature selection technique includes using cross-validation for determining an f-ratio threshold that provides a greatest between class variance when compared to a variance within a class.

13. The method of claim 1, wherein outputting is a method selected from the group consisting of receiving, displaying, printing, storing for further retrieval or processing, making available for download, and transmitting an resultant output.

14. The method of claim 1, further comprising:
   providing an unknown sample data set that includes signal-vector data from a first order sensor, wherein the unknown sample data set includes unknown sample data collected under unknown conditions;
   adjusting the unknown sample data of the unknown sample data set to account for variations between the background data and the unknown sample data using the same method used for the training data set;
   normalizing the unknown sample data set using the same method used for the training data set;
   transforming the normalized unknown sample data set into wavelet coefficients using the same wavelet transformation technique used for the training data set;
   automatically selecting the same wavelet coefficients transformed from the training data set from the unknown sample data set;

comparing the wavelet coefficients from the unknown sample data set with the classification model using the pattern recognition technique; and outputting an identity of the unknown conditions associated with the unknown sample data set.

15. The method of claim 14, wherein the output also includes a probability determination as to the accuracy of the identity of the unknown conditions.

16. A computer system, comprising:

a training data set comprising signal-vector data, including background data and sample data provided by at least one first order sensor under known conditions;

a processor that receives the training data set, the processor including software suitable for each of the following applications:

adjusting the sample data to account for variances between the background data and the sample data, normalizing the training data set, transforming the normalized training data set into wavelet coefficients using a wavelet transformation technique, automatically selecting desirable wavelet coefficients for classification using an analysis of variance feature selection technique;

classifying the training data set using a pattern recognition technique; and a non-transitory computer readable medium capable of storing a classification model generated from the pattern recognition technique.

17. The system of claim 16, further comprising:

an unknown sample data set comprising signal-vector data, including unknown sample data provided by the at least one first order sensor under unknown conditions, wherein the processor further including software suitable for each of the following applications:

adjusting the unknown sample data to account for variances between the background data and the unknown sample data in the same manner as the training data set, normalizing the unknown sample data set in the same manner as the training data set, transforming the normalized unknown sample data set into wavelet coefficients using the wavelet transformation technique used for as the training data set, automatically selecting the same desirable wavelet coefficients from the unknown sample data set as were selected for the training data set; and comparing the wavelet coefficients from the unknown sample data set with the classification model using the pattern recognition technique; and an output device for outputting an identity of the unknown conditions associated with the unknown sample data set.

18. The method of claim 17, the output also includes a probability determination as to the accuracy of the identity of the unknown conditions.

19. A sensing system, comprising:

at least one first order sensor, wherein the sensor senses the presence of a condition and produces signal-vector data;

an unknown sample data set comprising signal-vector data, including unknown sample data provided by the at least one sensor under unknown conditions a microprocessor connected with the at least one first order sensor including:

a stored classification model previously generated from a training data set; and software suitable for each of the following applications:

adjusting the unknown sample data to account for variances between background data and the unknown sample data, normalizing the unknown sample data set, transforming the normalized unknown sample data set into wavelet coefficients using a wavelet transformation technique used for the training data set, selecting desirable coefficients of the wavelet coefficients from the unknown sample data set as were selected for the training data set using an analysis of variance feature selection technique; and comparing the wavelet coefficients from the unknown sample data set with the classification model using a pattern recognition technique used to generate the classification model; and an output device for outputting an identity of the unknown conditions associated with the unknown sample data set.

20. The method of claim 19, the output also includes a probability determination as to the accuracy of the identity of the unknown conditions.

* * * * *